Jan. 17, 1961  C. E. BLANK  2,968,515
PRESTRESSED PISTON
Filed Oct. 7, 1959

INVENTOR
CHARLES E. BLANK
BY
HIS ATTORNEY

United States Patent Office 2,968,515
Patented Jan. 17, 1961

2,968,515

PRESTRESSED PISTON

Charles E. Blank, Painted Post, N.Y., assignor to Ingersoll-Rand Company, New York, N.Y., a corporation of New Jersey Filed Oct. 7, 1959, Ser. No. 844,911

7 Claims. (Cl. 309—14)

The present invention relates to pistons and more particularly to a lightweight piston fabricated in a prestressed manner.

One of the objects of this invention is to provide a piston which shall be light in weight yet structurally strong and durable.

Another object is to provide a prefabricated welded piston wherein all of the welded seams are adapted to be welded in a continuous line.

Another object of the invention is to provide a piston of the above indicated character wherein components thereof are assembled in a prestressed condition to increase the structural strength of the piston.

Further objects and advantages will appear more fully from the following specification and drawings, wherein like reference characters indicate like parts.

Figure 1:
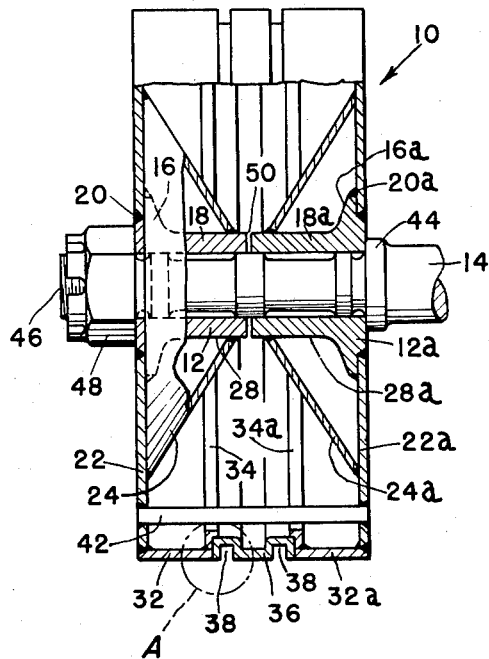
Figure 1 is an elevation view partly in section embodying a preferred form of the invention.

Referring now to the drawing and more particularly to Figure 1 in which is shown a piston assembly generally designated by the numeral 10. The piston assembly 10 comprises a pair of opposed hub collars 12 and 12a adapted to slidably encircle a piston rod 14. The hub collars 12 and 12a are substantially cylindrical sections flaring out into a circular base section 16 and 16a on one end thereof and terminating in a circular section 18 and 18a parallel thereto on the opposite end. The base sections 16 and 16a define therein shoulders 20 and 20a adapted to receive and weldably attach in co-planar relation with the end of the sections 16 and 16a, a pair of discs or end plates 22 and 22a which define the front and rear surfaces respectively of the piston assembly 10.

Figure 2:
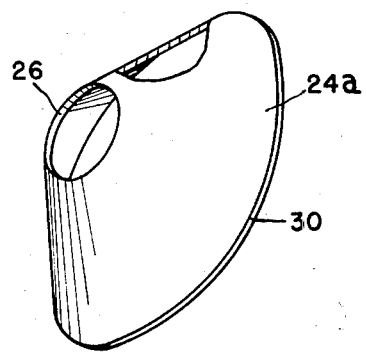
Figure 2 is a perspective view partly in section showing the conically shaped member embodied in Figure 1.
Figure 4:
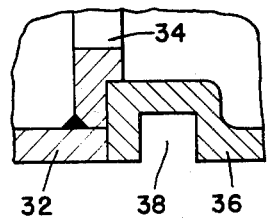
Figure 4 is an enlarged view of the portion of Figure 1 encompassed within the circle "A."
Figure 3:
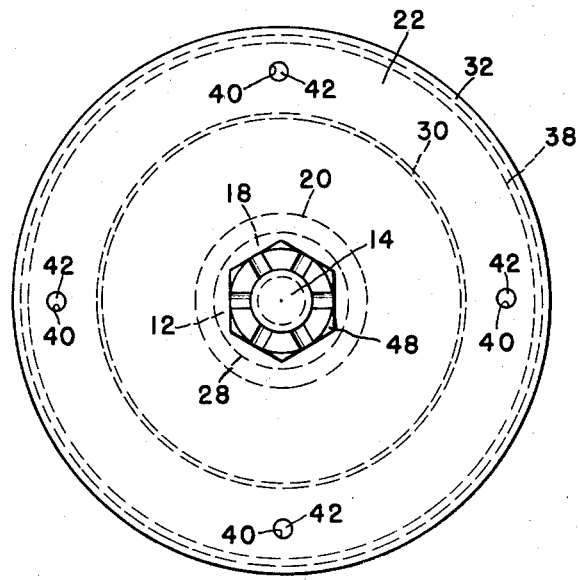
Figure 3 is an end view of Figure 1.

The piston assembly 10 further includes a pair of opposed conical stiffeners 24 and 24a (Fig. 2) having a nose section 26 encircling the hub collars 12 and 12a and weldably attached to a peripheral surface 28 and 28a thereof, and a base section 30 weldably attached to the end plates 22 and 22a. Hence the conical stiffeners 24 and 24a provide a firm structural reinforcement to oppose any load exerted against the front and rear surfaces of the piston assembly 10. A pair of outer cylindrical sections 32 and 32a encircle the conical stiffeners 24 and 24a and the hub collars 12 and 12a to form the outer periphery of the piston assembly 10 and are weldably attached to the periphery of the discs 22 and 22a on one end, and to a retaining ring 34 and 34a on the opposite end. The retaining rings 34 and 34a are substantially right angular in cross-section and adapted to receive a center piston ring carrier 36, abutting against and nested within the enclosed angle thereof (Fig. 4). Hence the retaining rings 34 and 34a restrain the center piston ring carrier 36 against radial motion with respect to the piston assembly 10.

In order to hold the piston rings (not shown here), the piston ring carrier 36 has one or more circumferential slots 38 in the outer surface thereof, two being shown in the illustrative embodiment herein.

The discs 22 and 22a further contain a plurality of holes 40, in axial alignment for the purpose of receiving a corresponding number of shrink rods 42. In the preferred form of the invention the shrink rods 42 are weldably attached to the discs 22 and 22a, although the attachment may be accomplished to equal advantage in any approved manner such as by a threaded connection or the like.

The invention further provides that the shrink rods 42 be attached to the end plates 22 and 22a in a pre-heated condition. In this manner the subsequent physical contraction of the shrink rods serves to augment the binding force thereof on the end plates 22 and 22a and to firmly wedge the piston ring carrier 36 in position between the retaining rings 34 and 34a.

Referring again to Figure 1, the hub collars 12 and 12a are opopsitely disposed on the piston rod 14 so that the end sections 18 and 18a thereof are frontally positioned. The piston rod 14 has a shoulder 44 bearing against the base section 16a, and extends through the piston assembly 10 to protrude therethrough with a threaded end 46 adapted to engage a nut 48 which locks the piston assembly 10 against the shoulder 44.

The invention provides that the length of the hub collars 12 and 12a is such that when assembled on the piston rod 14, a gap 50 exists therebetween prior to the tightening of the nut 48.

In the preferred form of the invention the various components of the piston assembly 10 are welded together along their appropriate abutting surfaces or edges, and it is to be particularly noted that the entire piston assembly may be welded, and further that each and every seam is susceptible to being welded in a continuous, exposed, and uninterrupted line easily adapted to the employment of machine welding techniques.

As illustrative of the foregoing, the discs 22 and 22a may be positioned onto the shoulders 20 and 20a and welded interiorly and exteriorly, each seam being in a continuous line, to the hub collars 12 and 12a. The conical stiffeners 24 and 24a may next be welded in like manner to the discs 22 and 22a and to the peripheral surfaces 28 and 28a. The retaining rings 34 and 34a may next be linearly welded to the outer cylindrical sections 32 and 32a and the latter in turn welded to the edge of the end plates 22 and 22a. The piston ring carrier 36 may then be properly positioned (Fig. 4) and the shrink rods 42 inserted in their proper holes in a pre-heated condition, and welded exteriorly to the end plates 22 and 22a. The nut 48 may now be applied to draw the entire piston assembly 10 firmly together.

It will now be appreciated that the tightening of the nut 48 will draw the hub collars 12 and 12a closer together thereby reducing the gap 50 and that the resultant effect thereof will be to cause an arching in the sides of the conical stiffeners 24 and 24a, and of the end plates 22 and 22a. This effect will be further enhanced and augmented by the subsequent contraction of the shrink rods 42. In this manner an additional stiffness and structural rigidity is imparted to the entire piston assembly far greater than could otherwise be obtained with the lightness and relative thinness of the gages employed.

I claim:

1. A piston comprising, a piston rod, a pair of hub collars encircling said rod and in spaced relation to each other, one of said collars being movable towards the other of said pair, an end plate attached to each collar, a stiffening member attached to each collar and respective end plate, and means for urging the collars towards each other to stress said stiffening members to increase the rigidity thereof.

2. A piston comprising, a piston rod, a pair of hub collars encircling said rod, a disc attached to each collar, a stiffening member attached to each collar and respective disc, and a plurality of preheated shrink rods attached to said discs adapted to arch said stiffening members and discs upon the cooling of said shrink rods.

3. A piston assembly comprising, a piston rod extending axially therethrough, a spaced pair of hub collars encircling said rod, an end plate attached to each collar, a stiffening member attached to each collar and respective end plate, a plurality of preheated shrink rods connecting said end plates, and means for reducing said spaced relation to arch said stiffening members and end plates to increase the rigidity of said piston assembly.

4. A piston assembly comprising, a piston rod extending axially therethrough, a pair of hub collars encircling said rod and in spaced relation to each other, a disc attached to each collar, a stiffening member attached to each collar and respective disc, a plurality of preheated shrink rods connecting said discs, and means for axially tightening said piston assembly along said piston rod in cooperation with said shrink rods to arch the stiffening members and discs.

5. A piston assembly comprising, a piston rod extending axially therethrough, a pair of hub collars encircling said rod, an end plate attached to each collar, a stiffening member attached to each collar and respective end plate, an outer cylindrical section enveloping each hub collar, a retaining ring attached to each cylindrical section, a piston ring carrier positioned between said retaining rings, and means for axially tightening said hub collars along said piston rod to clamp said piston ring carrier between said retaining rings to restrain motion thereof.

6. The piston assembly claimed in claim 5 in which each of said retaining rings has an abutment underlying said piston ring carrier to prevent radial motion thereof.

7. The piston assembly claimed in claim 5 in which said piston rod has a shoulder for axially tightening said hub collars thereagainst.

References Cited in the file of this patent
UNITED STATES PATENTS

| 2,679,441 | Stillwagon | May 25, 1954 |
| 2,768,037 | Payne | Oct. 23, 1956 |

FOREIGN PATENTS

| 947,476 | Germany | Aug. 16, 1956 |